United States Patent
Tohta

(10) Patent No.: US 10,308,253 B2
(45) Date of Patent: Jun. 4, 2019

(54) VEHICLE LOCK-UP CONTROL METHOD AND CONTROL DEVICE

(71) Applicant: Nissan Motor Co., Ltd., Yokohama-shi, Kanagawa (JP)

(72) Inventor: Yuzuru Tohta, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 15/763,266

(22) PCT Filed: Oct. 23, 2015

(86) PCT No.: PCT/JP2015/079977
§ 371 (c)(1),
(2) Date: Mar. 26, 2018

(87) PCT Pub. No.: WO2017/068717
PCT Pub. Date: Apr. 27, 2017

(65) Prior Publication Data
US 2018/0265087 A1    Sep. 20, 2018

(51) Int. Cl.
*B60W 10/02* (2006.01)
*B60W 10/06* (2006.01)
(Continued)

(52) U.S. Cl.
CPC ........ *B60W 30/1819* (2013.01); *B60W 10/02* (2013.01); *B60W 10/04* (2013.01);
(Continued)

(58) Field of Classification Search
CPC ............... B60W 10/026; B60W 10/06; B60W 2540/10; B60W 2710/025;
(Continued)

(56) References Cited

U.S. PATENT DOCUMENTS 5,267,158 A * 11/1993 Sakaguchi ............ F16H 61/143
477/174
5,800,306 A * 9/1998 Mori ..................... F16H 61/143
477/175
(Continued)

FOREIGN PATENT DOCUMENTS

CN     1782472 A      6/2006
CN   101842617 A      9/2010
(Continued)

*Primary Examiner* — Edwin A Young
(74) *Attorney, Agent, or Firm* — Global IP Counselors, LLP

(57) ABSTRACT

A vehicle includes an engine, a continuously variable transmission and a torque converter that has a lock-up clutch. The torque converter is arranged between the engine and the continuously variable transmission. In this vehicle, when an engagement request of the lock-up clutch is issued, an initial-motion lock-up control is executed, whereby engagement is achieved through slip control that increases the lock-up capacity and gradually reduces the slip rotational speed, which is the input-output differential rotational speed of the lock-up clutch. During the slip control of the initial-motion lock-up control, if the slip rotational speed enters a smooth ON control region that is at or below a first set value, a second engine torque reduction control is executed that reduces the torque of the engine below the normal torque that is applied in response to a driver's request.

7 Claims, 8 Drawing Sheets

(51) Int. Cl.
*B60W 30/18* (2012.01)
*B60W 10/04* (2006.01)
*B60W 10/10* (2012.01)
*F16H 61/14* (2006.01)
*F02D 29/00* (2006.01)
*F16H 63/50* (2006.01)

(52) U.S. Cl.
CPC ............ *B60W 10/06* (2013.01); *B60W 10/10* (2013.01); *F02D 29/00* (2013.01); *F16H 61/14* (2013.01); *F16H 63/50* (2013.01); B60W 2540/10 (2013.01); B60W 2710/025 (2013.01); F16H 2061/145 (2013.01)

(58) Field of Classification Search
CPC  B60W 2710/0666; F16H 61/14; F16H 63/50; F16H 2061/145
See application file for complete search history.

(56) References Cited

U.S. PATENT DOCUMENTS

| | | | |
|---|---|---|---|
| 8,296,028 B2 | 10/2012 | Matsunaga et al. | |
| 9,050,964 B2 | 6/2015 | Tohta et al. | |
| 9,610,935 B2 | 4/2017 | Reed et al. | |
| 2002/0107106 A1* | 8/2002 | Kato | B60K 31/0008 477/110 |
| 2006/0122755 A1 | 6/2006 | Segawa et al. | |
| 2008/0221765 A1* | 9/2008 | Thor | B60W 30/18 701/67 |
| 2009/0227407 A1* | 9/2009 | Kamada | B60K 6/445 475/5 |

FOREIGN PATENT DOCUMENTS

| | | |
|---|---|---|
| CN | 101842617 B | 1/2013 |
| CN | 103502611 A | 1/2014 |
| DE | 102008002283 A1 | 12/2009 |
| DE | 102010001282 A1 | 7/2011 |
| JP | 7-101273 A | 4/1995 |
| JP | 2004-138147 A | 5/2004 |
| RU | 2116895 C1 | 8/1998 |
| RU | 147824 U1 | 11/2014 |

* cited by examiner

VEHICLE LOCK-UP CONTROL METHOD AND CONTROL DEVICE

CROSS-REFERENCE TO RELATED APPLICATIONS

This application is a U.S. National stage application of International Application No. PCT/JP2015/079977, filed on Oct. 23, 2015.

BACKGROUND

Field of the Invention

The present invention relates to a vehicle lock-up control method and control device, in which, when a lock-up clutch in a released state is put into an engaged state at the time of starting or traveling, the lock-up clutch is shifted to the engaged state via a slip control.

Background Information

Conventionally, an engagement force control device for a lock-up clutch is known, in which a torque converter disposed between an engine and a transmission and having a lock-up clutch is provided, and an initial-motion lock-up control is executed, in which the lock-up clutch is slip controlled at the time of starting. In this initial-motion lock-up control, lock-up capacity is gradually increased and slip rotational speed is decreased, to thereby shift the lock-up clutch from a released state to an engaged state (for example, refer to Japanese Laid Open Patent Application No. 2004-138147—Patent Document 1).

SUMMARY

However, in the conventional device, when a depression increase operation of the accelerator pedal is carried out immediately before the lock-up clutch is engaged during a slip control of an initial-motion lock-up control, there is a risk that the following problem occurs. That is, due to an increase in engine torque accompanying an accelerator pedal depression increase operation, in some cases, the engine torque exceeds the lock-up capacity. As a result, even if it occurs immediately before the lock-up clutch is engaged, so-called rotation peeling occurs, in which the slip rotational speed switches from decreasing to increasing. Engagement shock and judder (self-excited vibration) occur due to this rotation peeling.

In view of the problems described above, an object of the present invention is to provide a vehicle lock-up control method and control device, which prevent an occurrence of engagement shock and judder during a slip control of the lock-up control, even if an accelerator pedal depression increase operation is carried out immediately before the lock-up clutch is engaged.

In order to achieve the object described above, the present invention comprises a torque converter that has a lock-up clutch and that is disposed between an engine and a transmission. In this vehicle, when an engagement request of the lock-up clutch is issued, a lock-up control is executed, whereby engagement is achieved through slip control that increases the lock-up capacity and gradually reduces the slip rotational speed, which is the input-output differential rotational speed of the lock-up clutch. During a slip control of the lock-up control, if the slip rotational speed reaches or falls below a predetermined value or less, an engine torque reduction control is executed, whereby the engine torque is reduced to be below the normal torque that is applied in response to a driver's request.

Therefore, if the slip rotational speed reaches or falls below a predetermined value during a slip control of the lock-up control, an engine torque reduction control is executed, whereby the engine torque is reduced to be below the normal torque that is applied in response to a driver's request. That is, the slip rotational speed of the lock-up clutch is reduced and the slip rotational speed reaches or falls below a predetermined value immediately before the lock-up clutch is engaged. Accordingly, an increase in the engine torque is suppressed by carrying out an engine torque reduction control, even if an accelerator pedal depression increase operation is carried out in a region immediately before the lock-up clutch is engaged. Therefore, the engine torque will not exceed the lock-up capacity, and so-called rotation peeling, in which the slip rotational speed switches from decreasing to increasing, is prevented. As a result, it is possible to prevent occurrence of engagement shock and judder during a slip control of the lock-up control, even if an accelerator pedal depression increase operation is carried out immediately before the lock-up clutch is engaged.

DETAILED DESCRIPTION OF EMBODIMENTS

Figure 1:
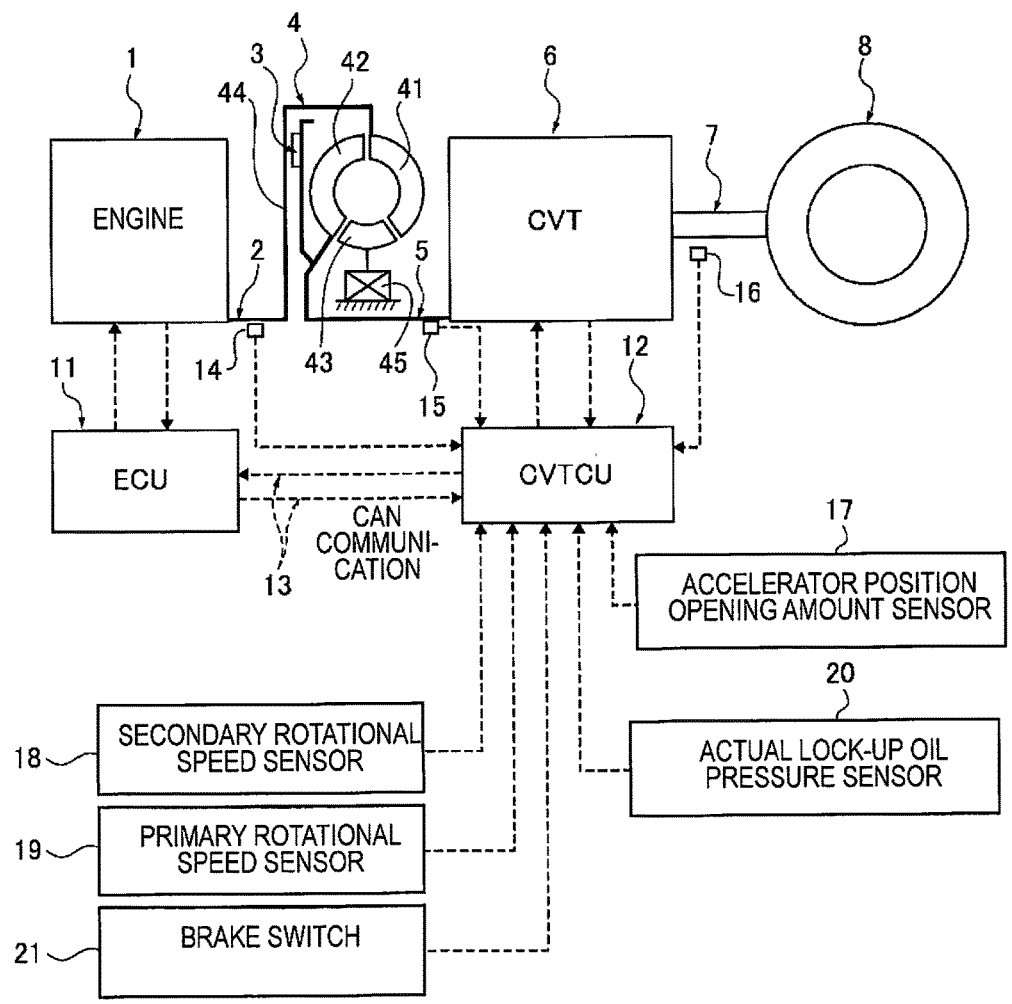
FIG. 1 is an overall system view illustrating an engine-equipped vehicle to which is applied the lock-up control method and control device according to the first embodiment.

A preferred embodiment for realizing the vehicle lock-up control method and control device of the present invention is described below based on the first embodiment and the second embodiment illustrated in the drawings.

First Embodiment

The configuration is described first. The lock-up control method and control device in the first embodiment are applied to an engine-equipped vehicle equipped with a torque converter and a continuously variable transmission (CVT). The "overall system configuration," the "configuration of the initial-motion lock-up control process," and the "configuration of the cooperative control process" will be separately described regarding the configuration of the lock-up control method and control device of an engine-equipped vehicle as described in the first embodiment.

Overall System Configuration

FIG. 1 illustrates an engine-equipped vehicle to which is applied the lock-up control method and control device of the first embodiment. The overall system configuration will be described below, based on FIG. 1.

The vehicle drive system comprises an engine 1, an engine output shaft 2, a lock-up clutch 3, a torque converter 4, a transmission input shaft 5, a continuously variable transmission 6 (transmission), a drive shaft 7, and drive wheels 8, as illustrated in FIG. 1.

The lock-up clutch 3 is built into the torque converter 4, couples the engine 1 and the continuously variable transmission 6 via the torque converter 4 by releasing the clutch, and directly connects the engine output shaft 2 and the transmission input shaft 5 by engaging the clutch. The engagement/slip engagement/release of this lock-up clutch 3 is controlled by the actual lock-up oil pressure that is regulated based on the line pressure, which is the source pressure, when a lock-up command pressure is output from a CVT control unit 12 to be described later. Line pressure is produced by regulating, using a line pressure solenoid valve, the pressure of the discharge oil of an oil pump, which is not shown, that is rotationally driven by the engine 1.

The torque converter 4 comprises a pump impeller 41, a turbine runner 42 that is disposed opposite the pump impeller 41, and a stator 43 that is disposed between the pump impeller 41 and the turbine runner 42. This torque converter 4 is a fluid coupling that transmits torque by the hydraulic oil filled therein being circulated to each blade of the pump impeller 41, the turbine runner 42, and the stator 43. The pump impeller 41 is coupled with the engine output shaft 2 via a converter cover 44, the inner surface of which is the engagement surface of the lock-up clutch 3. The turbine runner 42 is coupled with the transmission input shaft 5. The stator 43 is provided on a stationary member (transmission case, etc.) via a one-way clutch 45.

The continuously variable transmission 6 is a belt type continuously variable transmission that continuously controls the transmission ratio by assigning the belt contact diameter to a primary pulley and a secondary pulley, and the output rotation after shifting is transmitted to the drive wheels 8 via a drive shaft 7.

The vehicle control system comprises an engine control unit 11 (ECU), a CVT control unit 12 (CVTCU), and a CAN communication line 13, as illustrated in FIG. 1. An engine rotation sensor 14, a turbine rotation sensor 15 (=CVT input rotation sensor), and a CVT output rotation sensor 16 (=vehicle speed sensor) are provided as sensors for obtaining input information. Further provided are an accelerator position opening amount sensor 17, a secondary rotational speed sensor 18, a primary rotational speed sensor 19, an actual lock-up oil pressure sensor 20, a brake switch 21, and the like.

The engine control unit 11 reduces the fuel injection amount to the engine 1 so as to obtain a torque reduction value that is based on the accelerator position opening amount APO, when receiving a torque reduction signal requesting the start of an engine torque reduction control from the CVT control unit 12 via the CAN communication line 13. Then, when the torque reduction signal received from the CVT control unit 12 via the CAN communication line 13 stops during execution of an engine torque reduction control, a fuel injection control for obtaining a normal torque corresponding to the driver's request is restored. A normal torque corresponding to the driver's request refers to an engine torque for obtaining a driver-requested driving force calculated from the accelerator position opening amount APO (refer to the normal state engine torque map of FIG. 4).

The CVT control unit 12 carries out a transmission control for controlling the transmission ratio of the continuously variable transmission 6, a line pressure control, a lock-up control for controlling the engagement/slip engagement/release of the lock-up clutch 3, and the like. Of this lock-up control, at the time of start as initiated by depression of the accelerator, a lock-up engagement request is output to the lock-up clutch 3 to carry out an initial-motion lock-up control to transition to a fully engaged state via a slip control, for the purpose of improvement in fuel efficiency. In this initial-motion lock-up control, the line pressure itself is not stabilized while the line pressure, which is the source pressure of the actual lock-up oil pressure, is rising; therefore, the lock-up command value is delayed (the command value is maintained) as long as the line pressure is rising. Then, after a delay time has elapsed, the lock-up command value is raised, and a slip control is executed to gradually reduce the slip rotational speed. In addition, a cooperative control of the lock-up clutch 3 and the engine 1 is executed to execute an engine torque reduction control to reduce the torque of the engine 1 so as to be below the normal torque that is applied in response to a driver's request, during the initial-motion lock-up control.

Configuration of the Initial-Motion Lock-Up Control Process

Figure 2:
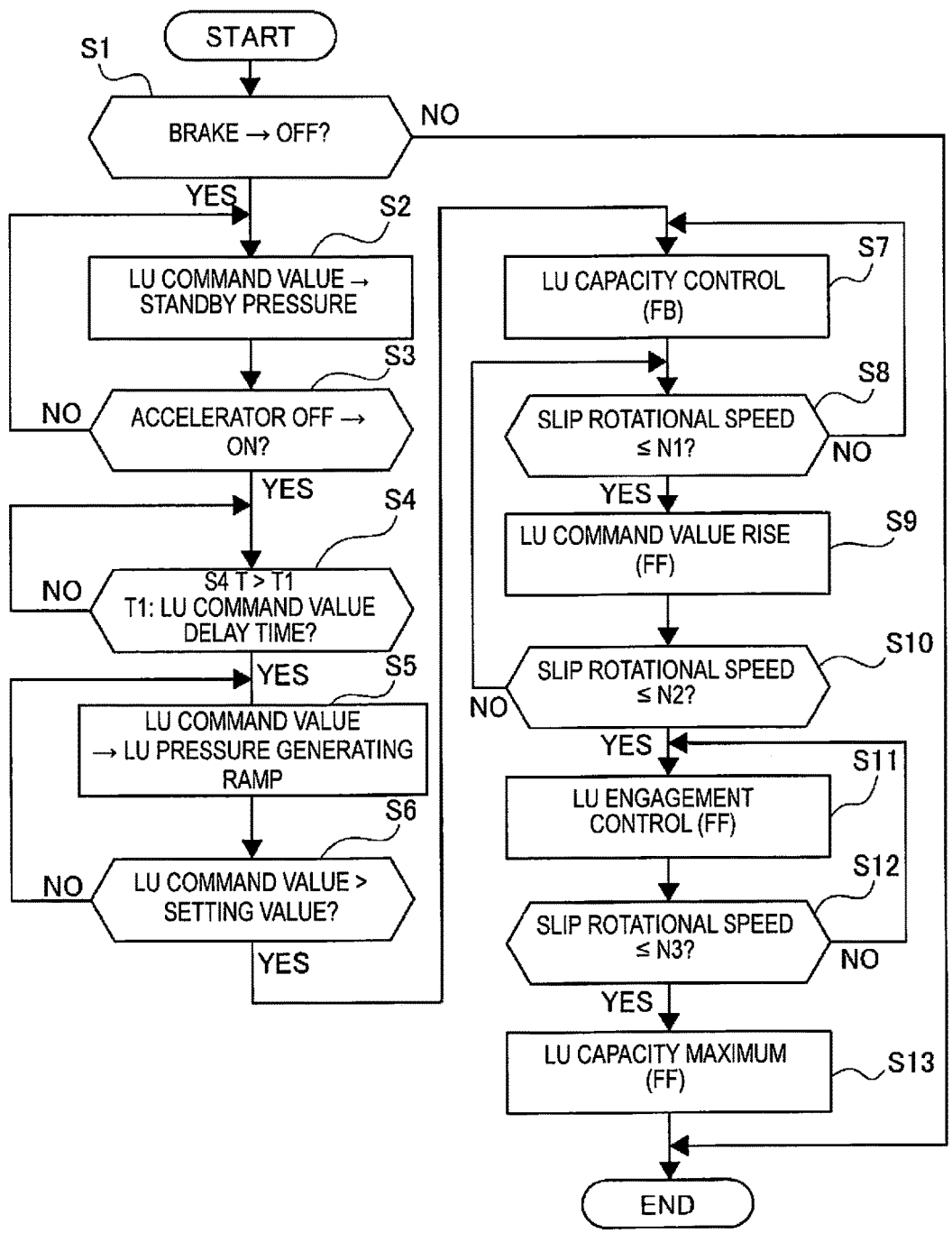
FIG. 2 is a flowchart illustrating the flow of an initial-motion lock-up control process of the lock-up clutch that is executed in a CVT control unit of the first embodiment.

FIG. 2 illustrates the flow of the initial-motion lock-up control process of the lock-up clutch 3 that is executed in the CVT control unit 12 of the first embodiment (lock-up clutch control unit). Each step in FIG. 2 showing the configuration of the process in the initial-motion lock-up control of the lock-up clutch 3 that is started while in a stopped state with the brake ON/accelerator OFF will be described below. The description "LU" is an abbreviation for "lock-up."

In Step S1, it is determined whether or not a switch signal from the brake switch 21 has been switched from ON to OFF by means of a brake foot release operation. If YES (brake ON→OFF), the process proceeds to Step S2, and if NO (other than brake ON→OFF), the process proceeds to END.

In Step S2, following a brake ON→OFF determination in Step S1 or a determination that it is other than accelerator OFF→ON in Step S3, the LU command value is set as the standby pressure, and the process proceeds to Step S3. Here, the "standby pressure" is a preparatory hydraulic oil pressure for preparing for an engagement of the lock-up clutch 3, to fill the hydraulic circuit to the lock-up clutch 3 with hydraulic oil, and the LU command value to obtain the standby pressure is set to a constant value at which the lock-up capacity does not occur.

In Step S3, following the LU command value=standby pressure in Step S2, it is determined whether or not an accelerator pedal depression operation has been carried out with the intent of starting the vehicle. If YES (accelerator OFF→ON), the process proceeds to Step S4, and if NO (other than accelerator OFF→ON), the process returns to Step S2. Here, the determination that an accelerator pedal depression operation has been carried out is determined, for example, when the accelerator position opening amount APO from the accelerator position opening amount sensor 17 transitions from a 0/8 opening amount (accelerator pedal release state) to an opening amount that is higher than a 0/8 opening amount. In addition, when using an accelerator switch, it is determined when the switch signal has been switched from OFF (accelerator pedal release state) to ON (accelerator pedal depression state).

In Step S4, following the determination of accelerator OFF→ON in Step S3 or the determination that T≤T1 in Step S4, it is determined whether or not a timer value T, the counting of which is started when an accelerator pedal depression operation is determined in Step S3, has exceeded an LU command value delay time T1. In the case of YES (T>T1), the process proceeds to Step S5, and if NO (T≤T1), the determination of Step S4 is repeated. Here, the "LU command value delay time T1" is set as the time required for the line pressure to rise and stabilize after starting, based on numerous experimental data. The LU command value delay time T1 may be provided as a fixed time or as a variable time that differs depending on the transmission hydraulic oil temperature, which is an influential factor in the hydraulic response.

In Step S5, after the determination that T>T1 in Step S4 or the determination that LU command value≤setting value in Step S6, the LU command value is raised using an LU pressure generating ramp inclination, and the process proceeds to Step S6. That is, by raising the LU command value using the LU pressure generating ramp inclination, the LU pressure is raised from the standby pressure to a meeting point initial pressure at which the LU capacity (=clutch transmission torque) starts to be output. The LU pressure generating ramp inclination of the LU command value may be provided using a stepped gradient by which means the LU command value rises at once.

In Step S6, following LU command value=LU pressure generating ramp inclination in Step S5, it is determined whether or not the LU command value has exceeded a setting value for obtaining a meeting point initial pressure at which the LU capacity starts to be output. In the case of YES (LU command value>setting value), the process proceeds to Step S7, and if NO (LU command value≤setting value), the process returns to Step S5.

In Step S7, following the determination that LU command value>setting value in Step S6 or the determination that slip rotational speed>N1 in Step S8, a lock-up capacity control (FB control) of the lock-up clutch 3 is executed, and the process proceeds to Step S8. In this lock-up capacity control, the target slip rotational speed characteristic of the lock-up clutch 3 is set to a characteristic that decreases with a gradual gradient, from when it is determined that LU command value>setting value. Then, the LU command value to the lock-up clutch 3 is subjected to feedback control (FB control), such that the actual slip rotational speed (=engine rotational speed Ne−turbine rotational speed Nt) coincides with the target engine rotational speed by the target slip rotational speed characteristic.

In Step S8, following the LU capacity control (FB control) in Step S7 or the determination that slip rotational speed>N2 in Step S10, it is determined whether or not the slip rotational speed has reached or fallen below a first setting value N1, and the process proceeds to Step S9. Here, the "first setting value N1" is a threshold value for determining that the slip rotational speed has entered a smooth ON control region immediately before engagement and is set, for example, to a value of about N1=200 rpm. The value of this first setting value N1 is also used as a determination start threshold of an accelerator pedal depression increase determination range, in the cooperative control process of FIG. 3.

In Step S9, following the determination that slip rotational speed≤N1 in Step S8, a ramp control (FF control) for raising the LU command value using a predetermined ramp inclination is executed, and the process proceeds to Step S10. Here, the "predetermined ramp inclination" is provided by an increase gradient of the LU command value that increases the decrease speed of the slip rotational speed more than the LU capacity control (FB control). An "FF control (feed forward control)" is different from an FB control, which takes into consideration the actual slip rotational speed and the target slip rotational speed and refers to a control for outputting an LU command value according to a set ramp inclination characteristic.

In Step S10, following an increase in the LU command value (FF control) in Step S9, it is determined whether or not the slip rotational speed has reached or fallen below a second setting value N2. If YES (slip rotational speed≤N2), the process proceeds to Step S11, and if NO (slip rotational speed>N2), the process returns to Step S8. Here, the "second setting value N2 (=clutch engagement determination rotational speed)" is a threshold value for determining that the slip rotational speed has entered a region in which the clutch can be regarded as engaged and is set, for example, to a value of about N2=50 rpm. The value of this second setting value N2 is also used as a determination end threshold of an accelerator pedal depression increase determination range, in the cooperative control process of FIG. 3.

In Step S11, following the determination that slip rotational speed≤N2 in Step S10 or the determination that slip rotational speed>N3 in Step S12, an LU engagement control (FF control) is executed, and the process proceeds to Step S12. Here, in the "LU engagement control," a feed forward control (FF control) for rapidly raising the LU command value using a ramp inclination that is greater than the ramp inclination in Step S9 is executed, in order to promptly shift the lock-up clutch 3 to an engaged state.

In Step S12, following the LU engagement control (FF control) in Step S11, it is determined whether or not the slip rotational speed has reached or fallen below a third setting value N3. If YES (slip rotational speed≤N3), the process proceeds to Step S13, and if NO (slip rotational speed>N3), the process returns to Step S11. Here, the "third setting value N3" is a threshold value for determining that the slip rotational speed has disappeared and is set, for example, to a value of about N3=10 rpm.

In Step S13, following the determination that slip rotational speed≤N3 in Step S12, a control (FF control) to maximize the LU capacity is executed, and the process proceeds to END. Here, in the "control to maximize the LU capacity," a feed forward control (FF control) for raising the LU command value to the maximum value in a stepwise manner is executed, in order to bring the lock-up clutch 3 into a fully engaged state.

Configuration of the Cooperative Control Process

Figure 3:
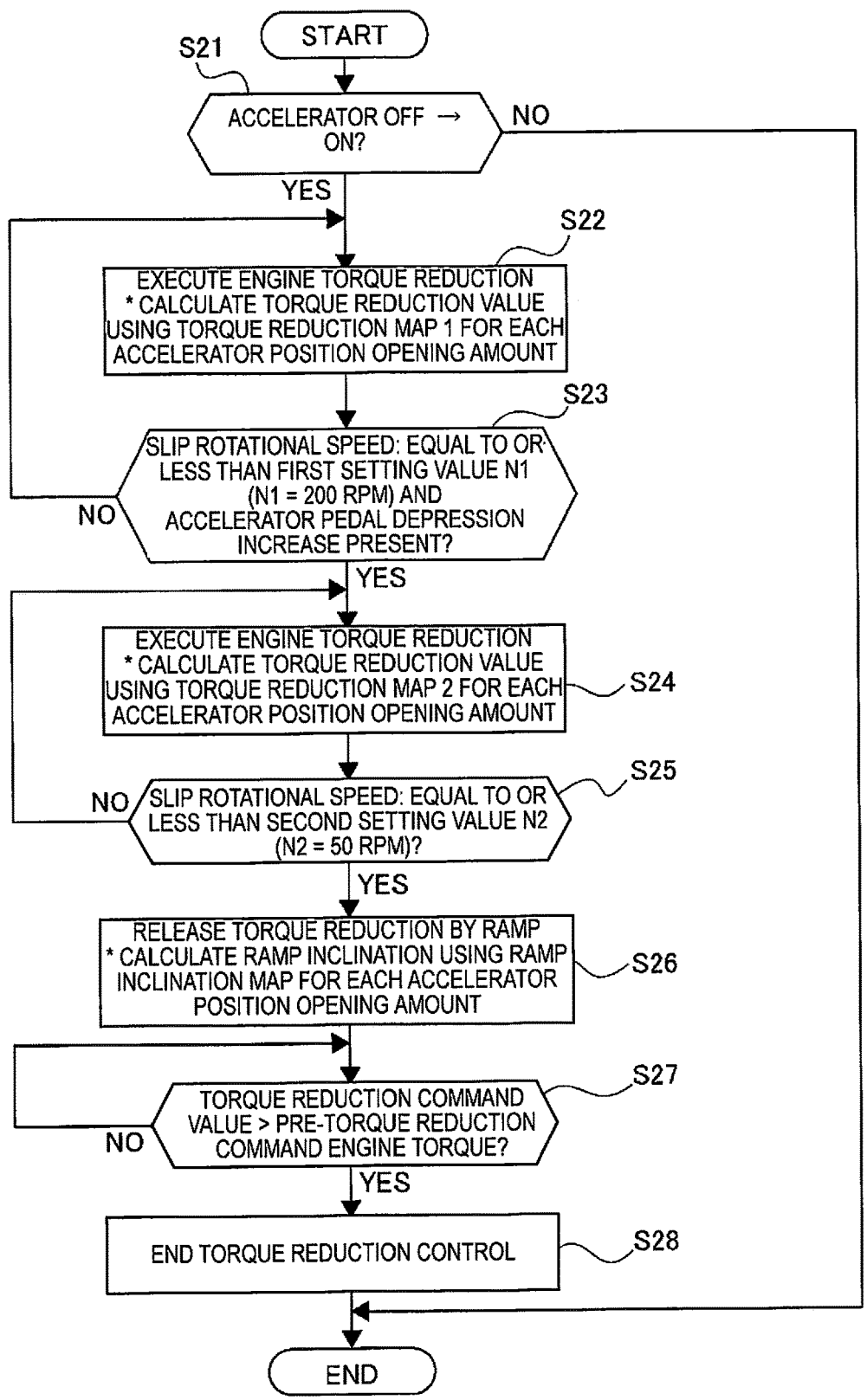
FIG. 3 is a flowchart illustrating the flow of a cooperative control process of the lock-up clutch and the engine that is executed in the CVT control unit of the first embodiment.

FIG. 3 illustrates the flow of a cooperative control process of the lock-up clutch 3 and the engine 1 that is executed in the CVT control unit 12 of the first embodiment (cooperative control unit). Each step in FIG. 3 showing the configuration of the process in the cooperative control of the lock-up clutch 3 and the engine 1 (initial-motion lock-up control process+engine torque reduction control) that is started while in a stopped state with the accelerator OFF will be described below. This cooperative control process is started at the same time as the start of the initial-motion lock-up control.

In Step S21, it is determined whether or not an accelerator pedal depression operation has been carried out with the intent of starting the vehicle, after a brake OFF operation for starting the initial-motion lock-up control. If YES (accelerator OFF→ON), the process proceeds to Step S22, and if NO (other than accelerator OFF→ON), the process proceeds to END. Here, the determination that an accelerator pedal depression operation has been carried out is made by using the same determination as in Step S3 of FIG. 2.

Figure 4:
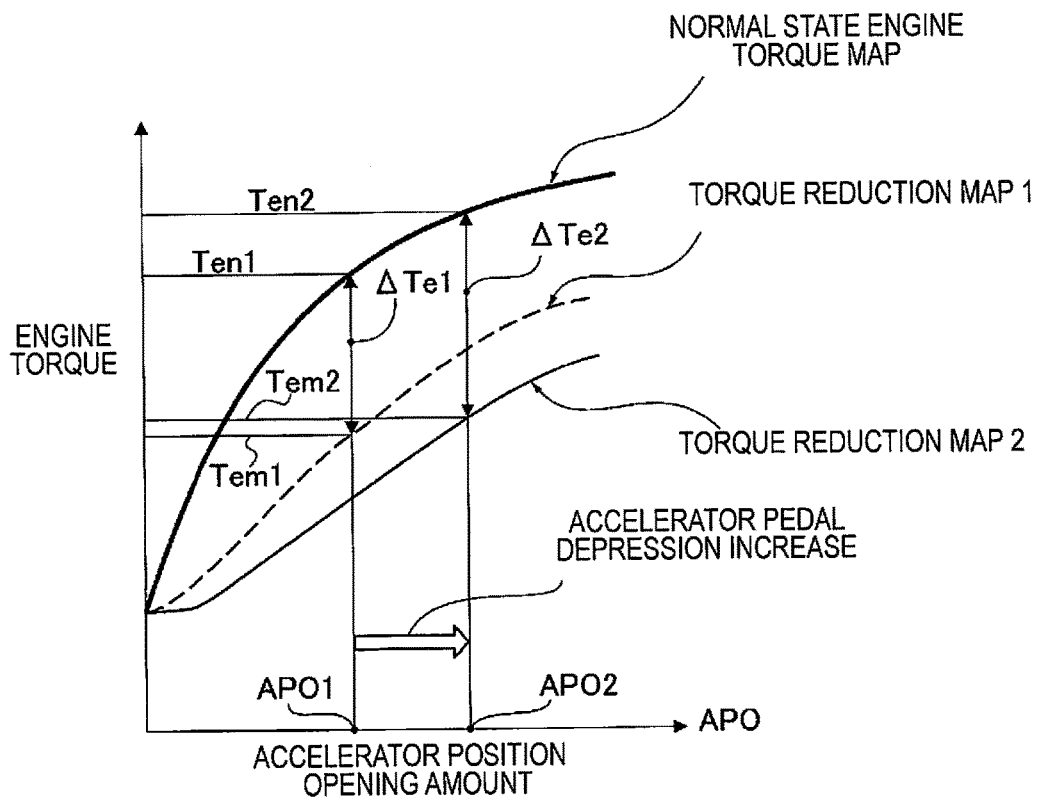
FIG. 4 is an engine torque map diagram illustrating an example of a normal state engine torque map, a torque reduction map 1, and a torque reduction map 2 with respect to the accelerator position opening amount used when calculating the torque reduction value of the cooperative control process of FIG. 3.

In Step S22, following the determination of accelerator OFF→ON in Step S21 or the determination that slip rotational speed>N1 or that an accelerator pedal depression increase is absent in Step S23, an engine torque reduction control (first engine torque reduction control) is executed, and the process proceeds to Step S23. Here, the engine torque reduction control is started by outputting an engine torque reduction signal to the engine control unit 11 via the CAN communication line 13. The torque reduction value ΔTe1 (first torque reduction value) is a value obtained by subtracting map 1 engine torque Tem1 from normal state engine torque Ten1 when, for example, the accelerator position opening amount is APO1, as illustrated in FIG. 4.

In Step S23, following the execution of the first engine torque reduction control in Step S22, it is determined whether or not slip rotational speed≤N1 is established and that an accelerator pedal depression increase is present. If YES (slip rotational speed≤N1 and accelerator pedal depression increase is present), the process proceeds to Step S24, and if NO (slip rotational speed>N1 or accelerator pedal depression increase is absent), the process returns to Step S22. Here, the "first setting value N1" is a threshold value for determining that the slip rotational speed has entered a smooth ON control region immediately before engagement and is set, for example, to a value of about N1=200 rpm, which is the same value as the first setting value N1 used in Step S8 of FIG. 2. The determination of "accelerator pedal depression increase is present" is executed by monitoring the accelerator position opening amount APO and determining that accelerator pedal depression increase is present when, for example, the accelerator position opening amount APO increases to exceed a depression increase determination value.

In Step S24, following the determination that slip rotational speed≤N1 and that accelerator pedal depression increase is present in Step S23, or the determination that slip rotational speed>N2 in Step S25, an engine torque reduction control (second engine torque reduction control) is executed, and the process proceeds to Step S25. Here, the torque reduction value ΔTe2 (second torque reduction value) is a value obtained by subtracting map 2 engine torque Tem2 from normal state engine torque Ten2 when, for example, the accelerator position opening amount is APO2, as illustrated in FIG. 4. Since a second engine torque reduction control is executed following the first engine torque reduction control according to the torque reduction value ΔTe1 in Step S22, a control to reduce the torque reduction signal from map 1 engine torque Tem1 to map 2 engine torque Tem2 at accelerator position opening amount APO1 is executed.

In Step S25, following the execution of the second engine torque reduction control in Step S24, it is determined whether or not slip rotational speed≤N2 is established. If YES (slip rotational speed≤N2), the process proceeds to Step S25, and if NO (slip rotational speed>N2), the process returns to Step S24. Here, the "second setting value N2" is a threshold value for determining that the slip rotational speed has entered a region in which the clutch can be regarded as engaged and is set, for example, to a value of about N2=50 rpm, which is the same value as the second setting value N2 used in Step S10 of FIG. 2.

Figure 5:
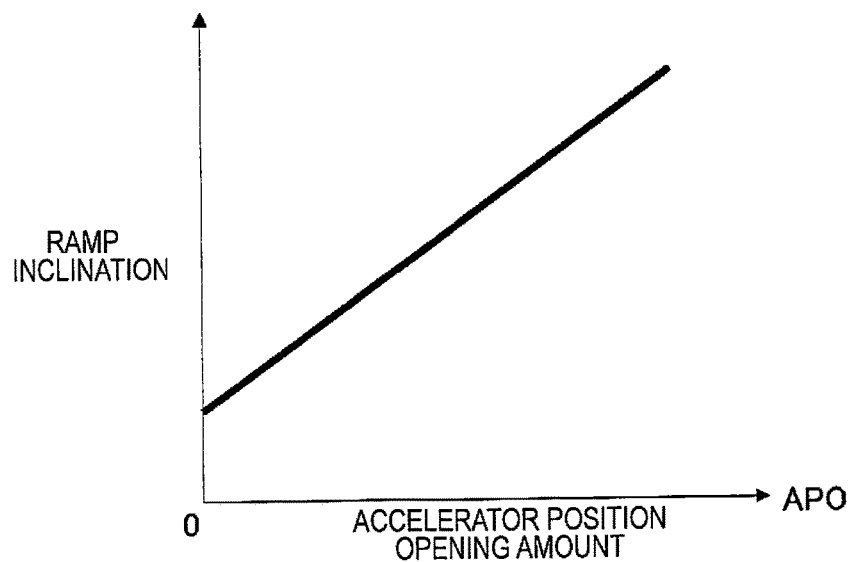
FIG. 5 is a ramp inclination map diagram illustrating an example of a ramp inclination map with respect to the accelerator position opening amount used when calculating the ramp inclination at the time of a torque reduction release control in the cooperative control process of FIG. 3.

In Step S26, following the determination that slip rotational speed≤N2 in Step S25, a torque reduction release control for returning the torque reduction value of the engine 1 to the normal torque using a predetermined ramp inclination is executed, and the process proceeds to Step S27. Here, the predetermined ramp inclination by which the engine torque is raised by means of the torque reduction release control is calculated such that the ramp inclination increases as the accelerator position opening amount APO increases, as indicated by the ramp inclination map of FIG. 5.

In Step S27, following the torque reduction release control in Step S26, it is determined whether or not the torque reduction command value has exceeded a pre-torque reduction command engine torque. If YES (torque reduction command value>pre-torque reduction command engine torque), the process proceeds to Step S28, and if NO (torque reduction command value≤pre-torque reduction command engine torque), the determination of Step S27 is repeated.

In Step S28, following the determination that torque reduction command value>pre-torque reduction command engine torque in Step S27, the engine torque reduction control is ended and the process proceeds to END. Here, the termination of the engine torque reduction control is executed by stopping the output of the engine torque reduction signal to the engine control unit 11 via the CAN communication line 13.

Next, the actions are described. The "action of the initial-motion lock-up control process," the "action of the cooperative control process," the "action of the initial-motion lock-up control," the "action of the cooperative control of the lock-up clutch and the engine," and the "characteristic action in the cooperative control" will be separately described, regarding the control actions in the engine-equipped vehicle of the first embodiment.

Action of the Initial-Motion Lock-Up Control Process

The action of the initial-motion lock-up control process will be described below, based on the flowchart illustrated in FIG. 2. When a brake pedal release operation is carried out from a stopped state with the brake ON/accelerator OFF, the process proceeds from Step S1→Step S2→Step S3 in the flowchart of FIG. 2. In Step S2, the LU command value is set as the standby pressure to fill the hydraulic circuit to the lock-up clutch 3 with hydraulic oil, and in Step S3, it is determined whether or not accelerator OFF→ON is established. Then, as long as it is determined that the accelerator is OFF in Step S3, the flow proceeding from Step S2→Step S3 is repeated, and LU command value=standby pressure is maintained.

When an accelerator pedal depression operation is carried out with the intent of starting the vehicle after a brake pedal release operation, and it is determined that accelerator OFF→ON is established in Step S3, the process proceeds from Step S3 to Step S4 in the flowchart of FIG. 2. In Step S4, it is determined whether or not a timer value T, the counting of which was started when an accelerator pedal depression operation was determined, has exceeded an LU command value delay time T1. Then, while it is determined that T→T1, the determination of Step S4 is repeated. That is, during the period from an accelerator pedal depression operation until the LU command value delay time T1 elapses, a standby state is maintained with the LU command value set as the standby pressure.

When the LU command value delay time T1 elapses from an accelerator pedal depression operation, the process proceeds from Step S4 to Step S5→Step S6 in the flowchart of FIG. 2. In Step S5, the LU command value is raised using the LU pressure generating ramp inclination, and in Step S6, it is determined whether or not the LU command value has exceeded a setting value. Then, as long as it is determined that LU command value≤setting value in Step S6, the flow that proceeds from Step S5→Step S6 is repeated. That is, the LU command value is raised from a value for obtaining the standby pressure to a value for obtaining the meeting point initial pressure at which the LU capacity starts to be output using the LU pressure generating ramp inclination.

When the LU command value exceeds the setting value and the LU capacity starts to be output, the process proceeds from Step S6 to Step S7→Step S8, in the flowchart of FIG. 2. In Step S7, a lock-up capacity control (FB control) of the lock-up clutch 3 is executed, and in Step S8, it is determined whether or not the slip rotational speed has reached or fallen below the first setting value N1. Then, as long as it is determined that slip rotational speed>N1 in Step S8, the flow that proceeds from Step S7→Step S8 is repeated. That is, during the period from when the LU capacity starts to be output to when the slip rotational speed of the lock-up clutch 3 reaches the first setting value N1 (for example, N1=200 rpm), the lock-up capacity of the lock-up clutch 3 is controlled using feedback control. In this feedback control, the lock-up capacity is controlled so as to eliminate the deviation between the actual slip rotational speed and the target slip rotational speed, that is, to converge the actual slip rotational speed and the target slip rotational speed, regardless of fluctuations in the input torque (=engine torque).

When the slip rotational speed of the lock-up clutch 3 reaches or falls below the first setting value N1, the process proceeds from Step S8 to Step S9→Step S10, in the flowchart of FIG. 2. In Step S9, a ramp control (FF control) for raising the LU command value using a predetermined ramp inclination is executed. In Step S10, it is determined whether or not the slip rotational speed has reached or fallen below the second setting value N2. Then, as long as it is determined that slip rotational speed>N2 in Step S10, the flow that proceeds from Step S8→Step S9→Step S10 is repeated. That is, in a smooth ON control region in which the slip rotational speed is between the first setting value N1 (for example, N1=200 rpm) and the second setting value N2 (for example, N2=50 rpm), the lock-up capacity of the lock-up clutch 3 is controlled by means of feed forward control having a high control response. If, after the feed forward control is started, the slip rotational speed exceeds the first setting value N1 due to some factor, a flow in which the process returns from Step S8 to Step S7 to restart the feedback control is also prepared.

When the slip rotational speed of the lock-up clutch 3 reaches or falls below the second setting value N2, the process proceeds from Step S10 to Step S11→Step S12 in the flowchart of FIG. 2. In Step S11, an LU engagement control (FF control) is executed, and in Step S12, it is determined whether or not the slip rotational speed has reached or fallen below the third setting value N3. Then, as long as it is determined that slip rotational speed>N3 in Step S12, the flow that proceeds from Step S11→Step S12 is repeated. That is, an engagement control for promptly shifting the lock-up clutch 3 to an engaged state is executed by means of a feed forward control having a high control response, when the slip rotational speed of the lock-up clutch 3 is between the second setting value N2 (for example, N2=50 rpm) until reaching the third setting value N3 (for example, N3=10 rpm).

When the slip rotational speed of the lock-up clutch 3 reaches or falls below the third setting value N3, the process proceeds from Step S12 to Step S13→END in the flowchart of FIG. 2. In Step S13, a control (FF control) to maximize the LU capacity is executed. That is, by carrying out a feed forward control (FF control) for raising the LU command value to the maximum value in a stepwise manner, the lock-up clutch 3 is brought into a fully engaged state.

Action of the Cooperative Control Process

The action of the cooperative control process will be described below, based on the flowchart illustrated in FIG. 3. When an accelerator pedal depression operation is carried out with the intent to start the vehicle from a stopped state with the brake OFF, the process proceeds from Step S21→Step S22→Step S23 in the flowchart of FIG. 3. In Step S22, an engine torque reduction control (first engine torque reduction control) is executed. In Step S23, it is determined whether or not slip rotational speed≤N1 and accelerator pedal depression increase is present. Then, as long as it is determined that slip rotational speed>N1 or that accelerator pedal depression increase is absent in Step S23, the flow that proceeds from Step S22→Step S23 is repeated. That is, a first engine torque reduction control is executed, in which an accelerator pedal depression operation is set as a start condition, and the engine torque is reduced from a normal state engine torque Ten1 to a map 1 engine torque Tem1 when, for example, the accelerator position opening amount is APO1. The torque reduction value ΔTe1 from the normal torque in this first engine torque reduction control is set as a value smaller than the torque reduction value ΔTe2 from the normal torque in the second engine torque reduction control to be described later.

When the slip rotational speed of the lock-up clutch 3 reaches or falls below the first setting value N1 (for example, N1=200 rpm) by means of an initial-motion lock-up control, and an accelerator pedal depression increase operation is carried out, the process proceeds from Step S23 to Step S24→Step S25 in the flowchart of FIG. 3. In Step S24, an engine torque reduction control (second engine torque reduction control) is executed. In Step S25, it is determined whether or not the slip rotational speed≤N2. Then, as long as it is determined that slip rotational speed>N2 in Step S25, the flow that proceeds from Step S24→Step S25 is repeated. That is, a second engine torque reduction control is executed, in which slip rotational speed≤N1 and presence of an accelerator pedal depression increase are set as start conditions, and the engine torque is reduced from a normal state engine torque Ten2 to a map 2 engine torque Tem2 when, for example, the accelerator position opening amount is APO2. The torque reduction value ΔTe2 from the normal torque in this second engine torque reduction control is set as a value larger than the torque reduction value ΔTe1 from the normal torque in the preceding first engine torque reduction control.

When the slip rotational speed of the lock-up clutch 3 reaches or falls below the second setting value N2 (for example, N2=50 rpm) by means of an initial-motion lock-up control, the process proceeds from Step S25 to Step S26→Step S27 in the flowchart of FIG. 3. In Step S26, a torque reduction release control for returning the torque reduction value of the engine 1 to the normal torque using a predetermined ramp inclination is executed. In Step S27, it is determined whether or not the torque reduction command value has exceeded a pre-torque reduction command engine torque. Then, as long as it is determined that torque reduction command value≤pre-torque reduction command engine torque, the determination of Step S27 is repeated. That is, a torque reduction release control is started to begin restoring the engine torque to the normal torque, under the condition that the slip rotational speed of the lock-up clutch 3 has reached or fallen below the second setting value N2. The ramp inclination, with which the engine torque is raised at this time, increases as the accelerator position opening amount APO increases.

When torque reduction command value>pre-torque reduction command engine torque is established due to the progress of the torque reduction release control, the process proceeds from Step S27 to Step S28→END in the flowchart of FIG. 3. In Step S28, the engine torque reduction control is ended by outputting an end request signal of the engine torque reduction control to the engine control unit 11 via the CAN communication line 13.

Action of the Initial-Motion Lock-Up Control

The action of the initial-motion lock-up control will be described below, based on the time charts illustrated in FIG. 6 and FIG. 7.

Figure 6:
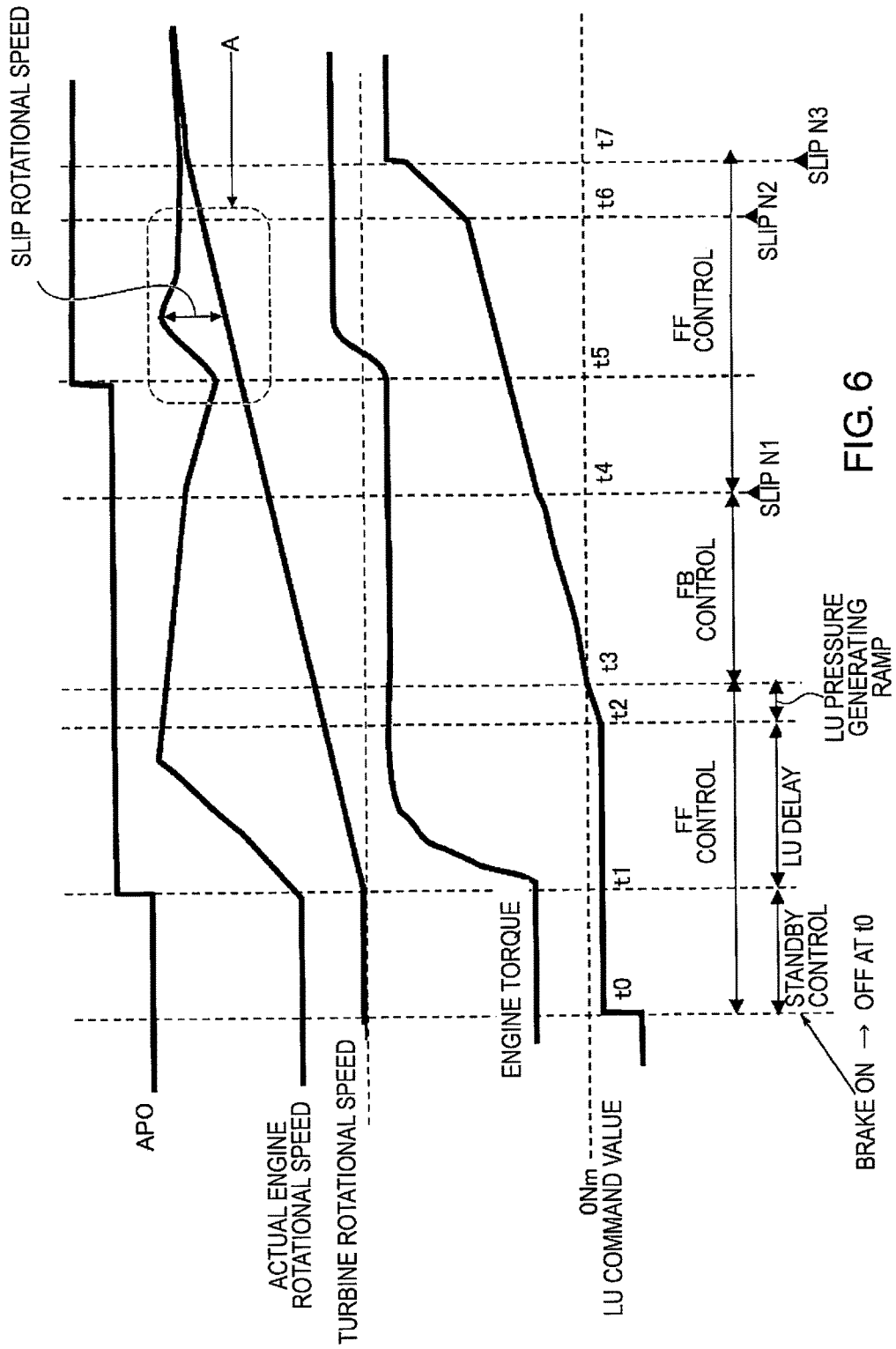
FIG. 6 is a time chart illustrating the respective characteristics of the accelerator position opening amount APO/actual engine rotational speed Ne/turbine rotational speed Nt/engine torque Te/lock-up command value (LU command value), when an accelerator pedal depression increase operation is carried out with a timing of immediately before clutch engagement, during a slip control of an initial-motion lock-up control of a comparative example.
Figure 7:
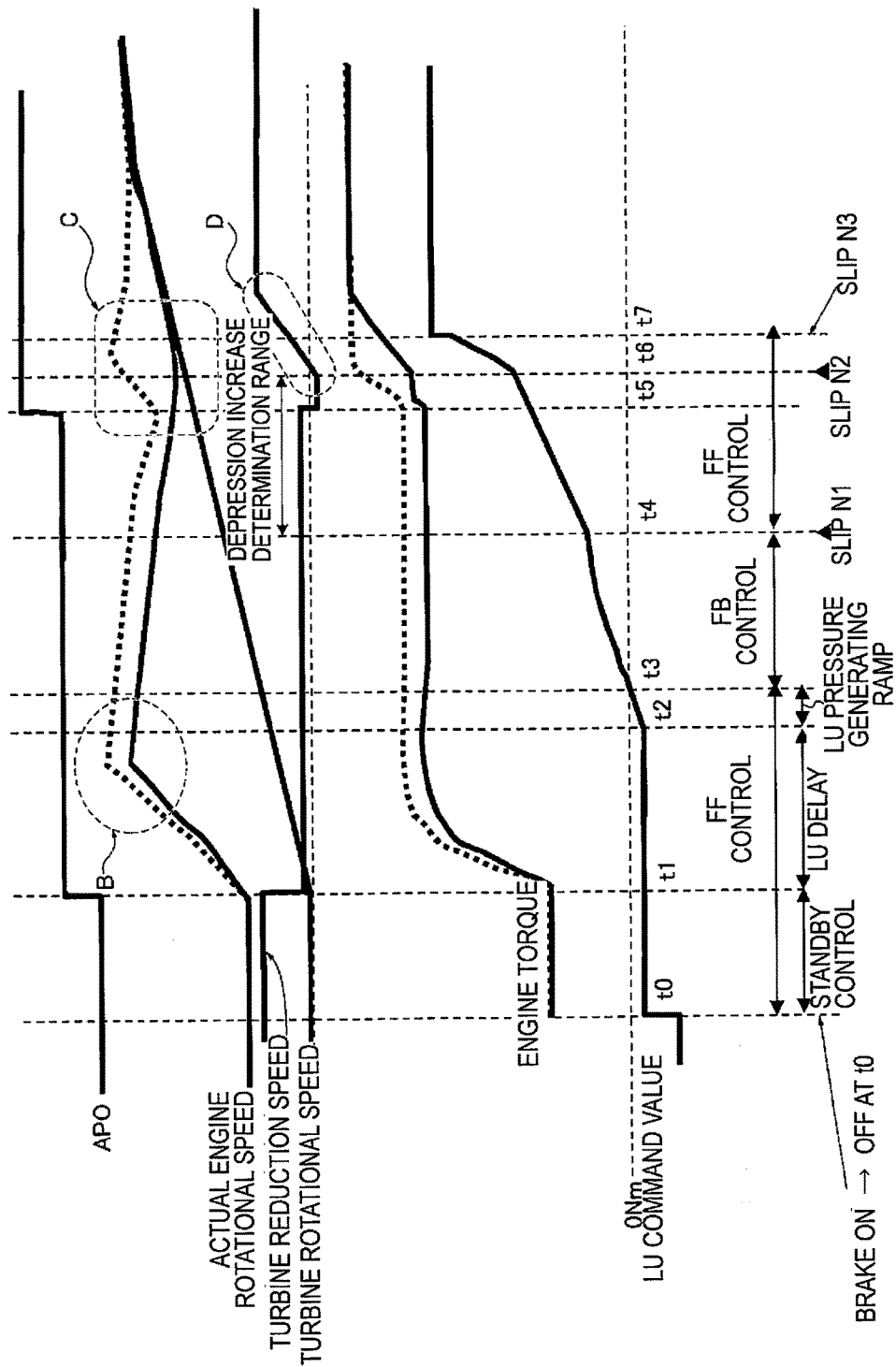
FIG. 7 is a time chart illustrating the respective characteristics of the accelerator position opening amount APO/actual engine rotational speed Ne/turbine rotational speed Nt/engine torque Te/lock-up command value (LU command value), when an accelerator pedal depression increase operation is carried out with a timing of immediately before clutch engagement, during a slip control of an initial-motion lock-up control of the first embodiment.

In FIG. 6 and FIG. 7, time t0 is a brake OFF operation time, time t1 is an accelerator pedal depression operation time, time t2 is an LU command value delay time end time from accelerator ON, and time t3 is a lock-up capacity generation time. Time t4 is a first setting value arrival time of the slip rotational speed, time t5 is the time of the accelerator pedal depression increase operation, time t6 is a second setting value arrival time of the slip rotational speed, and time t7 is a third setting value arrival time of the slip rotational speed.

The initial-motion lock-up control is roughly divided into a stroke control region (time t0-time t3), a slip control region (time t3-time t4), and a smooth ON control region (time t4-time t7).

The stroke control region (time t0-time t3) is a section in which the lock-up clutch 3 is shifted from a fully released state to a clutch stroke state in which lock-up capacity starts to occur, by means of a feed forward control. This stroke control region is divided into standby control, delay control, and ramp control.

When the brake is first (time t0) switched from ON to OFF, a standby control to increase the lock-up hydraulic pressure to the standby pressure is executed (time t0-time t1). Then, when the accelerator is switched from OFF to ON (time t1), a delay control is executed to stand by without changing the lock-up hydraulic pressure for a predetermined time (time t1-time t2). After the delay control is finished, a ramp control is executed to increase the hydraulic pressure using a predetermined ramp inclination for a predetermined time (time t2-time t3). Thereafter, the process shifts to the slip control region.

The slip control region (time t3-time t4) is a section in which the slip rotational speed of the lock-up clutch 3 is gradually decreased by means of a feedback control.

Specifically, a feedback control is executed that adjusts the lock-up capacity in accordance with fluctuations in the engine torque, so that the actual slip rotational speed approaches the target slip rotational speed. Fluctuation in the amount of change of the slip rotational speed per unit of time is suppressed, and sudden changes in the slip rotational speed are suppressed, by means of this feedback control. This slip control region is ended (time t4) when it is determined that the lock-up clutch 3 has entered a state immediately before engagement, due to the slip rotational speed becoming equal to or less than a first setting value N1 (for example, 200 rpm). Thereafter, the process shifts to the smooth ON control region.

The smooth ON control region (time t4-time t7) is a section for smoothly engaging the lock-up clutch 3 immediately before engagement by a slip engagement state, by means of a feed forward control. This smooth ON control region is a portion of the slip control region and is divided into the following three-stage controls. Here, the smooth ON control region is a slip control region according to a feed forward control in a slip convergence region and a portion of the slip control region, with respect to the slip control region according to a feedback control (time t3-time t4).

When the slip rotational speed of the lock-up clutch 3 is between the first setting value N1 (for example, 200 rpm) and the second setting value N2 (for example, 50 rpm), sudden engagement is prevented and generation of shock caused thereby is prevented, by increasing the lock-up capacity using a ramp inclination having a relatively gentle gradient (time t4-time t6). Then, when the slip rotational speed of the lock-up clutch 3 reaches or falls below the second setting value N2 (for example, 50 rpm), the lock-up clutch 3 is regarded as being engaged, and the lock-up capacity is increased using a relatively steep ramp inclination of the second stage (time t6-time t7). Here, the second setting value N2 is a slip rotational speed at which the slip rotational speed is sufficiently small and at which shock due to sudden engagement will not occur, even if the lock-up hydraulic pressure is increased. When the slip rotational speed of the lock-up clutch 3 reaches or falls below the third setting value N3 (for example, 10 rpm), it is regarded that clutch slip has been eliminated from the control, and the lock-up capacity is increased to the maximum value to bring the lock-up clutch 3 into an engaged state. Then, the smooth ON control region is ended at time t7.

Action of the Cooperative Control of the Lock-Up Clutch and the Engine

A case in which an initial-motion lock-up control of the lock-up clutch is independently executed, without carrying out a cooperative control using the engine torque reduction control, as in the first embodiment, shall be considered as a comparative example. The action of the initial-motion lock-up control in the comparative example will be described with reference to the time chart shown in FIG. 6.

In this comparative example, it is assumed that an accelerator pedal depression increase operation is carried out with a timing of time t5 immediately before the lock-up clutch is engaged, during a slip control in the initial-motion lock-up control, as illustrated by the accelerator position opening amount characteristic (APO characteristic) in FIG. 6. Accompanying this accelerator pedal depression increase operation at time t5, the engine torque increases after time t5, as illustrated by the engine torque characteristic shown in FIG. 6. When the engine torque increases, the engine torque that is input to the lock-up clutch exceeds the lock-up capacity (=clutch engagement torque) of the lock-up clutch during slip control. As a result, even though it was immediately before the lock-up clutch is engaged, so-called rotation peeling occurs, in which the slip rotational speed, which was decreasing at time t5, switches to increasing after time t5, as illustrated by the characteristic in the frame indicated by arrow A in FIG. 6. In FIG. 6, the slip rotational speed is expressed by the difference between the actual engine rotational speed and the turbine rotational speed.

With the occurrence of this rotation peeling, engagement shock and judder (self-excited vibration) occur. A "judder" is a self-excited vibration in the high-frequency region, which is excited by entering a region in which the friction coefficient μ becomes a negative gradient characteristic, due to an increase in the relative rotational speed ν caused by rotation peeling. This judder occurs in a slip rotational speed increase region after time t5. Since the slip rotational speed, which has been decreasing until immediately before engagement, is switched to increasing again due to the rotation peeling, "engagement shock" as a longitudinal G variation that occurs due to a sudden engagement of the clutch for converging the slip rotational speed, which increases after time t5, in a short period of time, occurs. This engagement shock is mainly generated in the re-engagement region of time t6-time t7.

In contrast, in the first embodiment, an accelerator pedal depression operation is set as a start condition and, first, a first engine torque reduction control is executed to reduce the engine torque in the first stage. Then, when the following conditions are met—slip rotational speed≤N1 with accelerator pedal depression increase present, during the first engine torque reduction control—a second engine torque reduction control is executed to further reduce the engine torque in the second stage. The action of the cooperative control of the lock-up clutch 3 and the engine 1 in the first embodiment will be described below, based on the time chart illustrated in FIG. 7.

When an accelerator pedal depression operation is carried out at time t1, from time t1 to time t5, at which point the start conditions of the second engine torque reduction control are satisfied, the first engine torque reduction control is executed, as illustrated by the torque reduction signal characteristic in FIG. 7. With the execution of this first engine torque reduction control, as indicated by the engine torque characteristic according to the solid line in FIG. 7 (time t1-time t5), the engine torque decreases compared to the broken line characteristic according to the normal engine torque when torque reduction control is not executed. Accompanying this decrease in the engine torque, as indicated by the actual engine rotational speed characteristic according to the solid line in FIG. 7 (time t1-time t5), the actual engine rotational speed decreases compared to the broken line characteristic according to the normal actual engine rotational speed when torque reduction control is not executed. By executing this first engine torque reduction control, rotational racing of the engine 1 at time t1-time t2 is suppressed, as illustrated by the characteristic in the frame indicated by arrow B in FIG. 7. In addition, since the actual engine rotational speed decreases the maximum slip rotational speed decreases, and lock-up engagement becomes possible at an early stage; therefore, an improvement in fuel efficiency can be expected.

When the slip rotational speed reaches the first setting value N1 at time t4, an accelerator pedal depression increase determination is started. Then, when an accelerator pedal depression increase operation is carried out at time t5 as indicated by the accelerator position opening amount characteristic (APO characteristic) in FIG. 7, the conditions: slip rotational speed≤N1 with accelerator pedal depression increase present during the first engine torque reduction control are satisfied. When these conditions are satisfied, a second engine torque reduction control is executed to further reduce the engine torque in the second stage, from time t5 to time t6, when slip rotational speed≤N2 is satisfied, as indicated by the torque reduction signal characteristic in FIG. 7. With the execution of this second engine torque reduction control, as indicated by the engine torque characteristic according to the solid line shown in FIG. 7 (time t5-time t6), increase in the engine torque is suppressed compared to the broken line characteristic according to the normal engine torque when torque reduction control is not executed. Since an increase in the engine torque is suppressed, the engine torque that is input to the lock-up clutch 3 does not exceed the lock-up capacity of the lock-up clutch 3 during slip control. Accordingly, as indicated by the actual engine rotational speed characteristic of FIG. 7 (time t5-time t6), the actual engine rotational speed (solid line characteristic) from the accelerator pedal depression increase operation time t5 decreases, whereas the actual engine rotational speed (broken line characteristic) increases when torque reduction control is not executed.

Therefore, by executing the second engine torque reduction control, rotation peeling such as in the comparative example can be suppressed, as illustrated by the characteristic in the frame indicated by arrow C in FIG. 7. That is, the slip rotational speed expressed as the difference between the actual engine rotational speed and the turbine rotational speed decreases from time t5 to time t7, when slip rotational speed≤N3 is satisfied. As a result, it is possible to prevent engagement shock and judder (self-excited vibration), which are generated with the occurrence of rotation peeling.

Characteristic Action of the Cooperative Control

In the first embodiment, during the slip control of the initial-motion lock-up control, if the slip rotational speed enters a smooth ON control region that is at or below a first setting value N1, a second engine torque reduction control that reduces the torque of the engine 1 to be below the normal torque that is applied in response to a driver's request is executed. That is, the slip rotational speed of the lock-up clutch 3 is reduced and the slip rotational speed reaches or falls below the first setting value N1, immediately before the lock-up clutch 3 is engaged. Accordingly, an increase in the engine torque is suppressed by carrying out the second engine torque reduction control, even if an accelerator pedal depression increase operation is carried out in a region immediately before the lock-up clutch 3 is engaged. Therefore, the engine torque will not exceed the lock-up capacity and so-called rotation peeling, in which the slip rotational speed switches from decreasing to increasing, is prevented. As a result, it is possible to prevent occurrence of engagement shock and judder during a slip control of the initial-motion lock-up control, even if an accelerator pedal depression increase operation is carried out immediately before the lock-up clutch 3 is engaged.

Here, "normal torque" is the engine torque during normal traveling, when no torque reduction at all is being executed. That is, it is a mode in which, when the accelerator position opening amount APO is at the maximum (fully opened), the throttle valve opening amount of the engine 1 is fully opened so as to exert the maximum engine torque relative to the engine rotational speed, and when the accelerator position opening amount APO is other than the maximum, the throttle opening amount is set to a predetermined setting value, such that the proportion of the actual engine torque relative to the maximum engine torque increases as the proportion of the actual accelerator position opening amount relative to the maximum accelerator position opening amount increases (refer to the normal state engine torque map in FIG. 4).

In addition, the "second engine torque reduction control" is executed by applying the torque reduction map 2 in FIG. 4, which determines the upper limit value of the engine torque for each accelerator position opening amount. The upper limit value of the engine torque determined by the torque reduction map 2 is set to be smaller than the lock-up capacity when carrying out a smooth ON control. The throttle valve opening amount of the engine 1 relative to the accelerator position opening amount APO is set to be smaller than during the normal state described above, so as to not exceed this upper limit value of the engine torque.

In the first embodiment, the start condition of the second engine torque reduction control are that the slip rotational speed is equal to or less than the first setting value N1 and that an accelerator pedal depression increase is present. That is, by adding an accelerator pedal depression increase operation condition, it is possible to eliminate an unnecessary reduction in the engine torque when an accelerator pedal depression increase is absent after entering a smooth ON control, and thus when there is no risk for rotation peeling to occur. Therefore, it is possible to solve the problem that discomfort is imparted to the driver due to the lack of torque output at the time of an unnecessary reduction in the engine torque described above.

Here, the "region where the slip rotational speed is equal to or less than the first setting value N1" is the smooth ON control region according to a feed forward control, in which an LU command value according to a predetermined ramp characteristic is output. In other words, the slip control region in which the slip rotational speed exceeds the first setting value N1 (time t3-time t4) is a feedback control region in which a target slip rotational speed is determined and an LU command value is output so that the actual slip rotational speed converges with the target slip rotational speed. Therefore, even if the engine torque fluctuates due to an accelerator pedal operation in a feedback control region, a control to adjust the lock-up capacity is executed corresponding to the engine torque fluctuation. In contrast, the smooth ON control region in which the slip rotational speed is equal to or less than the first setting value N1 (time t4-time t7) is a feed forward control region in which a predetermined LU command value is output. Therefore, there is no correspondence to a rise in the engine torque due to an accelerator pedal depression increase operation, and if an accelerator pedal depression increase operation is carried out, the engine torque exceeds the lock-up capacity, and an occurrence of so-called rotation peeling, in which the slip rotational speed switches from decreasing to increasing, is allowed. Therefore, the second engine torque reduction control is executed only when necessary, when there is a high probability that rotation peeling has occurred, at the time of an accelerator pedal depression increase operation in the smooth ON control region.

In the first embodiment, the second engine torque reduction control is ended when the slip rotational speed of the lock-up clutch 3 converges to reach or fall below the second setting value N2, which is smaller than the first setting value N1, while executing the second engine torque reduction control. That is, if the slip rotational speed becoming zero is set as the end condition of the second engine torque reduction control, since the moment that the slip rotational speed becomes zero cannot be determined using a sensor, it is necessary to stand by for a predetermined time even after the slip rotational speed becomes zero, in order to determine a zero rotational speed. In this case, a problem occurs in that the driver feels a lag due to lack of torque output even while carrying out a zero rotational speed determination, in addition to the waiting time until the slip rotational speed becomes zero. Therefore, when the slip rotational speed reaches or falls below the second setting value N2, which is smaller than the first setting value N1, it is considered that the lock-up clutch 3 has been engaged in the control, and the second engine torque reduction control is ended. Here, the second setting value N2 is a slip rotational speed at which the slip rotational speed is sufficiently small and at which shock due to sudden engagement will not occur, even if the lock-up hydraulic pressure is increased. Thereby, it becomes possible to shorten the time that the driver feels a lag, compared to a case in which the above-described determination of slip rotational speed=0 is executed.

Here, when the second engine torque reduction control is ended and the engine torque is returned to the normal setting value, the engine torque is restored to the original value according to a ramp inclination function, as indicated by the characteristic in the frame indicated by arrow D in FIG. 7. The inclination of the ramp inclination function at this time is configured such that the ramp inclination is increased as the accelerator position opening amount APO increases, according to the ramp inclination map shown in FIG. 5. It is thereby possible to well respond to the driver-requested driving force. The ramp inclination map may be provided by means of a characteristic that is increased in a stepwise manner for each accelerator position opening amount region.

In the first embodiment, the engine torque reduction value $\Delta Te2$ from the normal torque Ten2 when executing the second engine torque reduction control is set to be small when the accelerator position opening amount APO is small and to become larger as the accelerator position opening amount APO increases. That is, even when the engine torque is being reduced, the engine torque tends to be larger as the accelerator position opening amount APO increases, in a range in which rotation peeling does not occur. Accordingly, changes in the engine torque relative to an acceleration request has the same tendency as in a normal state, and discomfort is not imparted to the driver. The upper limit value of the engine torque according to the torque reduction map 2 is set so that the engine torque becomes smaller as the accelerator position opening amount APO decreases, as illustrated in FIG. 4.

In the first embodiment, execution of the engine torque reduction control is started before the slip rotational speed reaches or falls below a predetermined value (first setting value N1) due to an initial-motion lock-up control. For example, when there is an accelerator pedal depression increase immediately before the lock-up clutch 3 is engaged, an engine torque reduction control is executed to reduce the engine torque from the normal torque to a torque determined by the torque reduction map 2. In this case, there are cases in which a large torque reduction step is generated at the time of starting the control, which may impart discomfort to the driver. In contrast, at the time of starting the vehicle, a first engine torque reduction control of the first stage (torque reduction map 1) is started at the same time as the accelerator is first switched from OFF to ON. Since this torque reduction control of the first stage is executed from the beginning, the driver will not notice that torque reduction is being executed in the first place. As a result, when an accelerator pedal depression increase is carried out immediately before the lock-up clutch 3 is engaged, and a second engine torque reduction control is executed to reduce the engine torque to a torque determined by the torque reduction map 2, the engine torque is already reduced to a torque determined by the torque reduction map 1. Accordingly, the torque reduction step that is generated can be small, compared to a case in which a torque reduction control is started when there is an accelerator pedal depression increase immediately before the lock-up clutch 3 is engaged. Therefore, it is possible to solve the problem that a large torque reduction step is generated when there is an accelerator pedal depression increase immediately before the lock-up clutch 3 is engaged, thereby imparting discomfort to the driver.

In the first embodiment, when a start operation due to accelerator OFF→ON is determined, a first engine torque reduction control is started to reduce the torque of the engine 1 from the normal torque Te1 applied in response to a driver's request using a first torque reduction value $\Delta$Te1. Then, while executing the first engine torque reduction control, when the slip rotational speed reaches or falls below the first setting value N1 due to an initial-motion lock-up control and the smooth ON control is started, it is shifted to an execution of the second engine torque reduction control, which changes the torque reduction value to the second torque reduction value $\Delta$Te2, which is larger than the first torque reduction value $\Delta$Te1. That is, at the time of starting the vehicle, a first engine torque reduction control of the first stage (torque reduction map 1) is started at the same time as the accelerator is first switched from OFF to ON. Thereafter, when there is an accelerator depression increase immediately before the lock-up clutch 3 is engaged, the second engine torque reduction control of the second stage (torque reduction map 2) is started. In this manner, by dividing the engine torque reduction control into two stages, it is possible to set a relationship of first torque reduction value $\Delta$Te1<second torque reduction value $\Delta$Te2 as the torque reduction values. Therefore, it is possible to secure a start of the vehicle while exerting sufficient torque by means of a first engine torque reduction control of the first stage, with respect to a driver's acceleration request from immediately after a start operation by the accelerator OFF→ON.

Next, the effects are described. The effects listed below can be obtained by means of the lock-up control method and control device of an engine-equipped vehicle according to the first embodiment.

(1) In a vehicle (engine-equipped vehicle) comprising a torque converter 4 that has a lock-up clutch 3 and that is arranged between an engine 1 and a transmission (continuously variable transmission 6), when an engagement request of the lock-up clutch 3 is issued, a lock-up control (initial-motion lock-up control) is executed, whereby engagement is achieved through slip control that increases a lock-up capacity and gradually reduces a slip rotational speed, which is the input-output differential rotational speed of the lock-up clutch 3 (FIG. 2), and during the slip control of the lock-up control (initial-motion lock-up control), if the slip rotational speed reaches or falls below a predetermined value (first setting value N1) (enters a smooth ON control), an engine torque reduction control (second engine torque reduction control) that reduces the torque of the engine 1 to below a normal torque that is applied in response to a driver's request is executed (S23→S24 in FIG. 3). Accordingly, it is possible to provide a vehicle (engine-equipped vehicle) lock-up control method that prevents the occurrence of engagement shock and judder during a slip control of the lock-up control (initial-motion lock-up control), even if an accelerator pedal depression increase operation is carried out immediately before the lock-up clutch 3 is engaged.

(2) Start conditions of the engine torque reduction control (second engine torque reduction control) are set such that the slip rotational speed is equal to or less than a predetermined value (first setting value N1) (in a smooth ON control region) and such that an accelerator pedal depression increase is present (S23 in FIG. 3). Accordingly, in addition to the effect of (1), an engine torque reduction control (second engine torque reduction control) is not started when a reduction in the engine torque is not necessary, and it is possible to reduce the frequency at which discomfort is imparted to the driver due to a lack of engine torque output.

(3) The engine torque reduction control (second engine torque reduction control) is ended when the slip rotational speed of the lock-up clutch 3 converges to reach or fall below a clutch engagement determination rotational speed (second setting value N2), which is smaller than the predetermined value (first setting value N1), while executing the engine torque reduction control (second engine torque reduction control). Accordingly, in addition to the effect of (1) or (2), it becomes possible to shorten the time that the driver feels lag due to a lack of engine torque output, compared to a case in which slip rotational speed=0 is determined.

(4) An engine torque reduction value $\Delta$Te2 from a normal torque Ten2 when executing the engine torque reduction control (second engine torque reduction control) is set to be small when an accelerator position opening amount APO is small and set to become larger as the accelerator position opening amount APO increases (FIG. 4). Accordingly, in addition to the effects of (1)-(3), changes in the engine torque relative to an acceleration request have the same tendency as in a normal state, and it is possible to reduce discomfort that is imparted to the driver.

(5) The lock-up control is an initial-motion lock-up control executed based on the determination of a start operation (brake ON→OFF), and execution of the engine torque reduction control is started before the slip rotational speed reaches or falls below a predetermined value (first setting value N1) due to the initial-motion lock-up control. Accordingly, in addition to the effects of (1)-(4), it is possible to reduce the discomfort that is imparted to the driver due to an occurrence of a large torque reduction step when there is an accelerator pedal depression increase immediately before the lock-up clutch 3 is engaged.

(6) The engine torque reduction control includes a first engine torque reduction control and a second engine torque reduction control, the first engine torque reduction control is started when a start operation (accelerator OFF→ON) is determined, to reduce the torque of the engine 1 from the normal torque Te1 applied in response to a driver's request by means of a first torque reduction value $\Delta$Te1, and the second engine torque reduction control is started when the slip rotational speed reaches or falls below the predetermined value (first setting value N1) due to the initial-motion lock-up control (started when entering a smooth ON control) while executing the first engine torque reduction control, to change the torque reduction value to a second torque reduction value $\Delta$Te2, which is larger than the first torque reduction value $\Delta$Te1. Accordingly, in addition to the effect of (5), by dividing the engine torque reduction control into two stages, it is possible to secure a start of the vehicle while exerting sufficient torque by means of the first engine torque reduction control of the first stage, with respect to a driver's acceleration request from immediately after a start operation is executed.

(7) In a vehicle (engine-equipped vehicle) comprising a torque converter 4 that has a lock-up clutch 3 and that is arranged between an engine 1 and a transmission (continuously variable transmission 6), provided with a lock-up control unit (initial-motion lock-up control unit: FIG. 2) that achieves engagement through slip control that increases the lock-up capacity and gradually reduces the slip rotational speed, which is the input-output differential rotational speed of the lock-up clutch 3, when an engagement request of the lock-up clutch 3 is issued, and a cooperative control unit (FIG. 3) that carries out cooperative control of the lock-up clutch 3 and the engine 1, if the slip rotational speed reaches or falls below a predetermined value (first setting value N1) (enters a smooth ON control) during the slip control of the lock-up control unit (initial-motion lock-up control unit: FIG. 2), the cooperative control unit (FIG. 3) carries out a process to execute an engine torque reduction control (second engine torque reduction control) that reduces the torque of the engine 1 below a normal torque that is applied in response to a driver's request. Accordingly, it is possible to provide a vehicle (engine-equipped vehicle) lock-up control device that prevents the occurrence of engagement shock and judder during a slip control of the lock-up control (initial-motion lock-up control), even if an accelerator pedal depression increase operation is carried out immediately before the lock-up clutch 3 is engaged.

Second Embodiment

The second embodiment is an example in which the first engine torque reduction control of the first embodiment is omitted and only a control that corresponds to the second engine torque reduction control of the first embodiment is executed during slip control of the lock-up control.

The configuration is described first. Since the "overall system configuration (FIG. 1)" and the "configuration of the initial-motion lock-up control process (FIG. 2)" in the second embodiment are the same as in the first embodiment, drawings and descriptions thereof are omitted. The "configuration of the cooperative control process" of the second embodiment will be described below.

Configuration of the Cooperative Control Process

Figure 8:
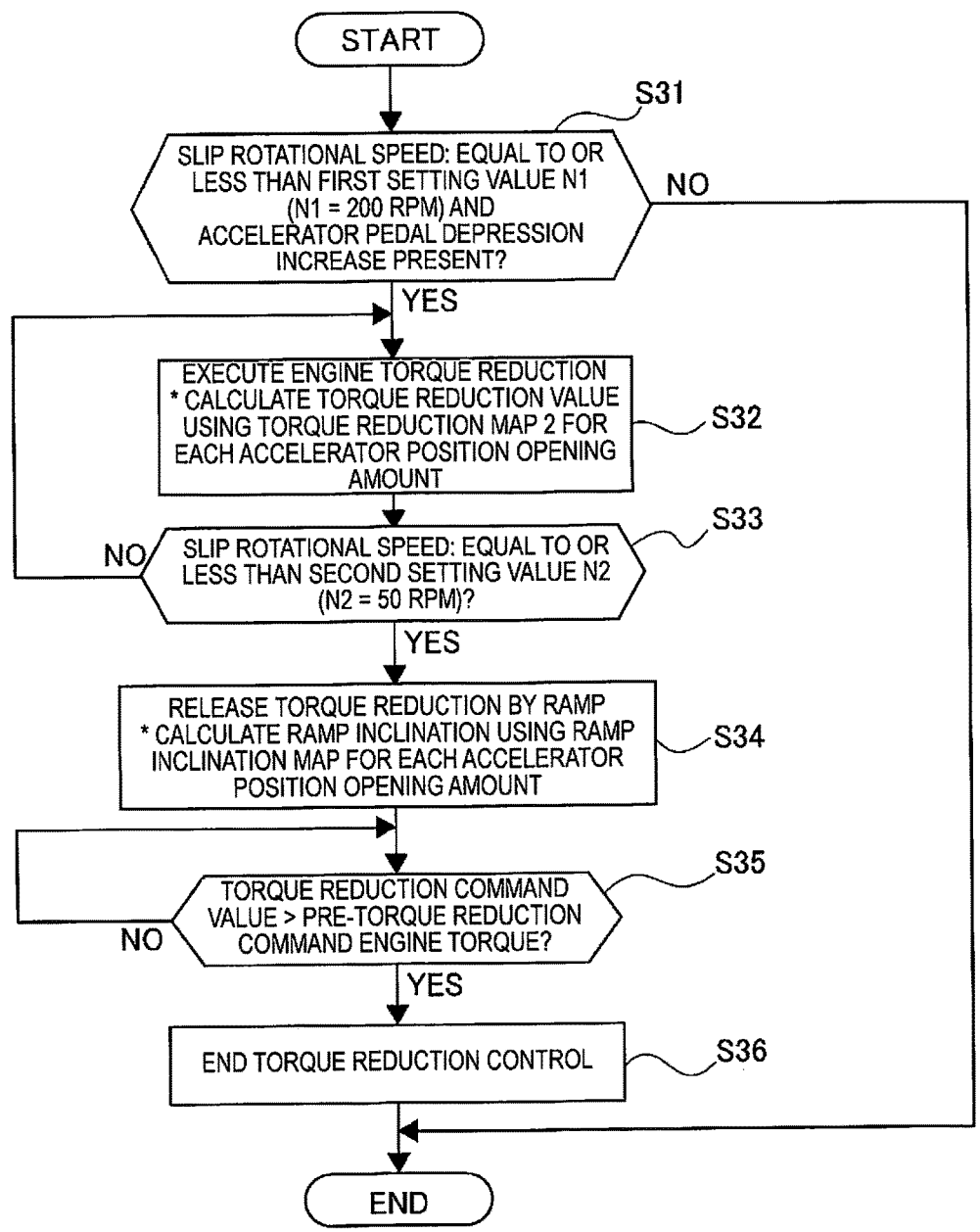
FIG. 8 is a flowchart illustrating the flow of a cooperative control process of the lock-up clutch and the engine that is executed in the CVT control unit of the second embodiment.

FIG. 8 illustrates the flow of a cooperative control process of the lock-up clutch 3 and the engine 1 that is executed in the CVT control unit 12 of the second embodiment (cooperative control unit). Each step in FIG. 8 showing the configuration of the process in the cooperative control of the lock-up clutch 3 and the engine 1 (initial-motion lock-up control process+engine torque reduction control) that is started in a stopped state with the accelerator OFF will be described below. This cooperative control process is started at the same time as the start of the initial-motion lock-up control.

In Step S31, during slip control of the initial-motion lock-up control, it is determined whether or not slip rotational speed≤N1 is established and that an accelerator pedal depression increase is present, in the same manner as in Step S23 in FIG. 3. If YES (slip rotational speed≤N1 and accelerator pedal depression increase is present), the process proceeds to Step S24, and if NO (slip rotational speed>N1 or accelerator pedal depression increase is absent), the process proceeds to END.

In Step S32, following the determination that slip rotational speed≤N1 and that accelerator pedal depression increase is present in Step S31 or the determination that slip rotational speed>N2 in Step S33, an engine torque reduction control is executed, and the process proceeds to Step S25. The torque reduction value in this engine torque reduction control is set to a value obtained by subtracting the map 2 engine torque from the normal engine torque, using the normal engine torque map and the torque reduction map 2 illustrated in FIG. 4.

In Step S33, following the execution of the engine torque reduction control in Step S32, it is determined whether or not slip rotational speed≤N2 is established, in the same manner as in Step S25 of FIG. 3. If YES (slip rotational speed≤N2), the process proceeds to Step S34, and if NO (slip rotational speed>N2), the process returns to Step S32.

In Step S34, following the determination that slip rotational speed≤N2 in Step S33, a torque reduction release control for returning the torque reduction value of the engine 1 to the normal torque using a predetermined ramp inclination is executed, and the process proceeds to Step S35.

In Step S35, following the torque reduction release control in Step S34, it is determined whether or not the torque reduction command value has exceeded a pre-torque reduction command engine torque, in the same manner as in Step S27 in FIG. 3. If YES (torque reduction command value>pre-torque reduction command engine torque), the process proceeds to Step S36, and if NO (torque reduction command value≤pre-torque reduction command engine torque), the determination of Step S35 is repeated.

In Step S36, following the determination that torque reduction command value>pre-torque reduction command engine torque in Step S35, the engine torque reduction control is ended and the process proceeds to END, in the same manner as in Step S28 in FIG. 3. Here, the termination of the engine torque reduction control is executed by stopping the output of the engine torque reduction signal to the engine control unit 11 via the CAN communication line 13.

Next, the actions are described. Of the actions in the second embodiment, the "action of the initial-motion lock-up control process," the "action of the initial-motion lock-up control," and the "characteristic action in the cooperative control" are the same as in the first embodiment; therefore, descriptions thereof are omitted. The "action of the cooperative control process" and the "action of the cooperative control of the lock-up clutch and the engine" will be separately described, regarding the control actions in the engine-equipped vehicle of the second embodiment.

Action of the Cooperative Control Process

The action of the cooperative control process will be described below, based on the flowchart illustrated in FIG. 8.

When the slip rotational speed of the lock-up clutch 3 reaches or falls below the first setting value N1 (for example, N1=200 rpm) by means of an initial-motion lock-up control and an accelerator pedal depression increase operation is carried out, the process proceeds from Step S31 to Step S332→Step S33 in the flowchart of FIG. 8. In Step S32, the engine torque reduction control is executed. In Step S33, it is determined whether or not the slip rotational speed≤N2. Then, as long as it is determined that slip rotational speed>N2 in Step S33, the flow that proceeds from Step S32→Step S33 is repeated. That is, an engine torque reduction control using the torque reduction map 2 is executed, in which slip rotational speed≤N1 and presence of an accelerator pedal depression increase are set as the start conditions. The torque reduction value from the normal torque in the engine torque reduction control is set to the torque reduction value ΔTe2 when, for example, the accelerator position opening amount after an accelerator pedal depression increase is APO2.

When the slip rotational speed of the lock-up clutch 3 reaches or falls below the second setting value N2 (for example, N2=50 rpm) by means of an initial-motion lock-up control, the process proceeds from Step S33 to Step S34→Step S35 in the flowchart of FIG. 8. In Step S34, a torque reduction release control for returning the torque reduction value of the engine 1 to the normal torque using a predetermined ramp inclination is executed. In Step S35, it is determined whether or not the torque reduction command value has exceeded a pre-torque reduction command engine torque. Then, as long as it is determined that torque reduction command value≤pre-torque reduction command engine torque, the determination of Step S35 is repeated. That is, a torque reduction release control is started to restore the engine torque toward the normal torque, under the condition that the slip rotational speed of the lock-up clutch 3 has reached or fallen below the second setting value N2. The ramp inclination, with which the engine torque is raised at this time, increases as the accelerator position opening amount APO increases.

When torque reduction command value>pre-torque reduction command engine torque is established due to the progress of the torque reduction release control, the process proceeds from Step S35 to Step S36→END, in the flowchart of FIG. 8. In Step S28, the engine torque reduction control is ended by outputting an end request signal of the engine torque reduction control to the engine control unit 11 via the CAN communication line 13.

Action of the Cooperative Control of the Lock-Up Clutch and the Engine

In the second embodiment, the first engine torque reduction control of the first embodiment is omitted, and an engine torque reduction control is executed when the following conditions are met: slip rotational speed≤N1 and accelerator pedal depression increase is present. The action of the cooperative control of the lock-up clutch 3 and the engine 1 in the second embodiment will be described below, based on the time chart illustrated in FIG. 9.

Figure 9:
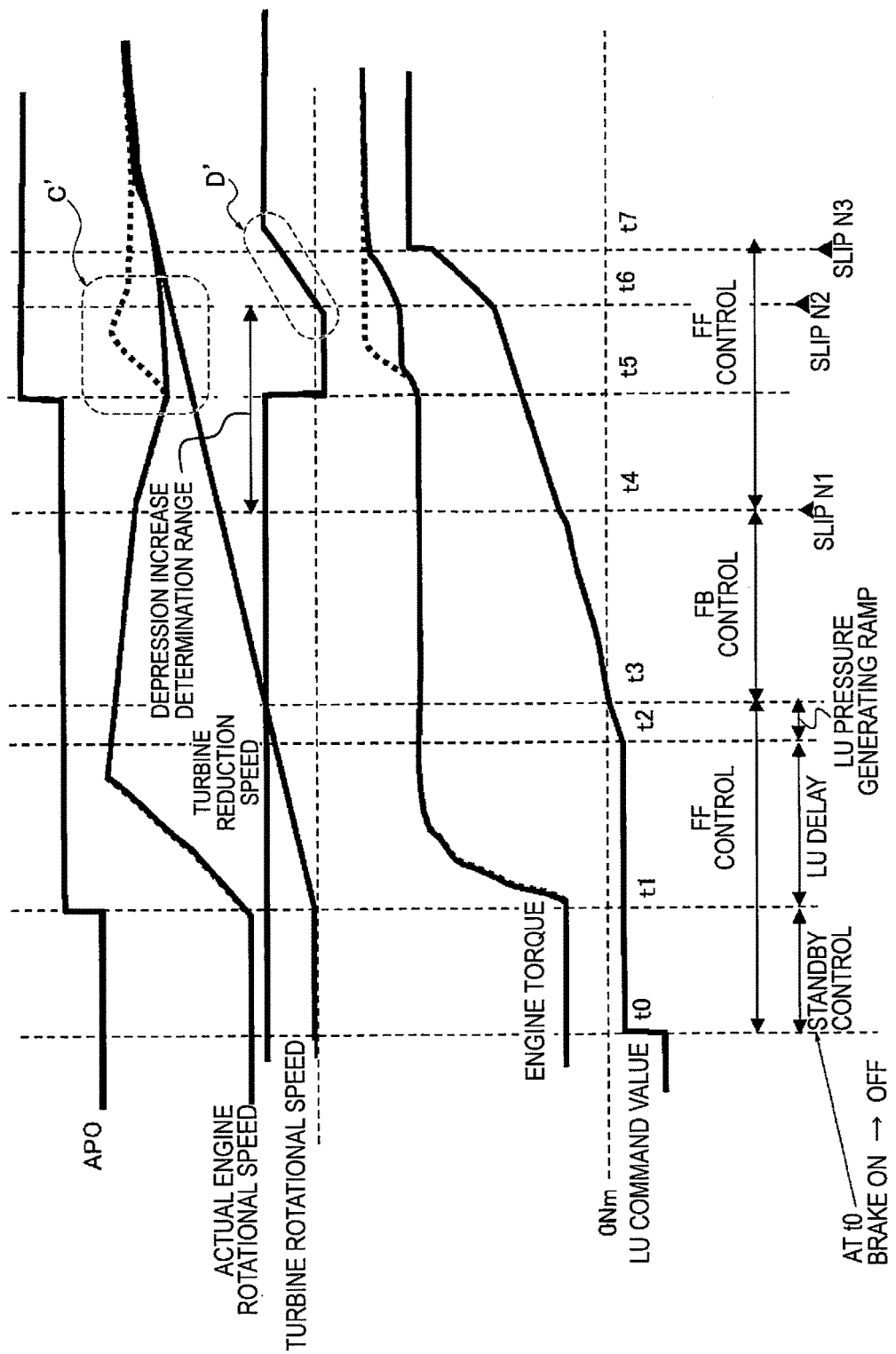
FIG. 9 is a time chart illustrating the respective characteristics of the accelerator position opening amount APO/actual engine rotational speed Ne/turbine rotational speed Nt/engine torque Te/lock-up command value (LU command value), when an accelerator pedal depression increase operation is carried out with a timing of immediately before clutch engagement, during a slip control of an initial-motion lock-up control of the second embodiment.

When an accelerator pedal depression operation is carried out at time t1, from time t1 to time t4, at which point the slip rotational speed reaches the first setting value N1, an engine torque reduction control is not executed, as illustrated by the torque reduction signal characteristic in FIG. 9. When the slip rotational speed reaches the first setting value N1 at time t4, an accelerator pedal depression increase determination is started. Then, when an accelerator pedal depression increase operation is carried out at time t5 as indicated by the accelerator position opening amount characteristic (APO characteristic) in FIG. 9, the conditions: slip rotational speed≤N1 and presence of accelerator pedal depression increase, are satisfied. When these conditions are satisfied, an engine torque reduction control is executed to reduce the engine torque, from time t5 to time t6, when slip rotational speed→N2 is satisfied, as indicated by the torque reduction signal characteristic in FIG. 9. With the execution of this engine torque reduction control, as indicated by the engine torque characteristic according to the solid line in FIG. 9 (time t5-time t6), increase in the engine torque is suppressed compared to the broken line characteristic according to a normal engine torque, when torque reduction control is not executed. Since an increase in the engine torque is suppressed, the engine torque that is input to the lock-up clutch 3 does not exceed the lock-up capacity of the lock-up clutch 3 during slip control. Accordingly, as indicated by the actual engine rotational speed characteristic of FIG. 9 (time t5-time t6), the actual engine rotational speed (solid line characteristic) from the accelerator pedal depression increase operation time t5 transitions in a flat manner, whereas the actual engine rotational speed (broken line characteristic) increases when torque reduction control is not executed.

Therefore, by executing the engine torque reduction control, rotation peeling such as in the comparative example can be suppressed, as illustrated by the characteristic in the frame indicated by arrow C' in FIG. 9. That is, the slip rotational speed expressed as the difference between the actual engine rotational speed and the turbine rotational speed decreases from time t5 to time t7, when slip rotational speed≤N3 is satisfied. As a result, it is possible to prevent engagement shock and judder (self-excited vibration), which are generated with the occurrence of rotation peeling.

Next, the effects are described. In the lock-up control method and control device of an engine-equipped vehicle according to the second embodiment, it is possible to obtain the effects of (1), (2), (3), (4), and (7) obtained by excluding the effects of (5) and (6) from among the effects of (1)-(7) of the first embodiment, due to omission of the first engine torque reduction control.

The vehicle lock-up control method and control device of the present invention were described above based on the first and second embodiments, but specific configurations thereof are not limited to these embodiments, and various modifications and additions to the design can be made without departing from the scope of the invention according to each claim in the Claims.

In the first and second embodiments, examples were shown in which an engine torque reduction control is executed when the following conditions are met: when in a smooth ON control region in which slip rotational speed≤N1 and accelerator pedal depression increase is present. However, when entering a smooth ON control region in which the slip rotational speed≤N1, an engine torque reduction control may be executed regardless of the presence/absence of an accelerator pedal depression increase operation, in order to prevent, in advance, rotation peeling when there is an accelerator pedal depression increase operation.

In the first embodiment, an example was shown in which an engine torque reduction control is executed using two torque reduction maps 1 and 2. However, the engine torque reduction control may, for example, use only the torque reduction map 2 and be executed simply from the time of initial accelerator OFF to ON. However, in this case, sufficient torque cannot be exerted with respect to a driver's acceleration request issued immediately after the accelerator is switched from OFF to ON. Accordingly, it is more preferable to use two torque reduction maps 1 and 2.

In the first embodiment, an example was shown in which the lock-up control is an initial-motion lock-up control, in which a lock-up clutch engagement process is started based on the determination of a start operation. However, the lock-up control may be a during-travel lock-up control, in which a lock-up engagement request is issued when the vehicle speed reaches or exceeds a predetermined vehicle speed while traveling to start a lock-up clutch engagement process, or the cooperative control of the present invention may be applied thereto.

In the first and second embodiments, examples were shown in which the lock-up control method and control device of the present invention are applied to an engine-equipped vehicle equipped with a torque converter and a continuously variable transmission. However, the lock-up clutch control device of the present invention may be applied to a hybrid vehicle, and the transmission may be a stepped transmission that carries out stepped automatic shifting, as long as the vehicle is equipped with an engine as a drive source. In short, the lock-up clutch control device may be applied to any vehicle provided with a torque converter comprising a lock-up clutch between the engine and the transmission.

The invention claimed is:

1. A vehicle lock-up control method for a vehicle having a torque converter with a lock-up clutch that is arranged between an engine and a transmission, the vehicle lock-up control method comprising:
    executing a lock-up control upon issuance of an engagement request of the lock-up clutch to engage the lock-up clutch through slip control by increasing a lock-up capacity and gradually reducing a slip rotational speed, which is an input-output differential rotational speed of the lock-up clutch, and
    executing an engine torque reduction control during the slip control of the lock-up control that reduces a torque of the engine below a normal torque that is applied in response to a driver's request upon the slip rotational speed reaching or falling below a predetermined value.

2. The vehicle lock-up control method according to claim 1, wherein
    start conditions for the engine torque reduction control include the slip rotational speed being equal to or less than the predetermined value and an accelerator pedal depression being increased.

3. The vehicle lock-up control method according to claim 1, wherein
    the engine torque reduction control is ended upon the slip rotational speed of the lock-up clutch converging to reach or fall below a clutch engagement determination rotational speed that is smaller than the predetermined value while executing the engine torque reduction control.

4. The vehicle lock-up control method according to claim 1, wherein
    while executing the engine torque reduction control, an engine torque reduction value for the normal torque is set to be smaller when an accelerator position opening amount is small, and set to become larger as the accelerator position opening amount increases.

5. The vehicle lock-up control method according to claim 1, wherein
    the lock-up control is an initial-motion lock-up control executed based on a determination of a start operation, and
    execution of the engine torque reduction control is started before the slip rotational speed reaches or falls below the predetermined value due to the initial-motion lock-up control.

6. The vehicle lock-up control method according to claim 5, wherein
    the engine torque reduction control includes a first engine torque reduction control and a second engine torque reduction control,
    the first engine torque reduction control is started upon determining the start operation to reduce the torque of the engine from the normal torque applied in response to a driver's request using a first torque reduction value, and
    the second engine torque reduction control is started when the slip rotational speed reaches or falls below the predetermined value due to the initial-motion lock-up control while executing the first engine torque reduction control to change a torque reduction value to a second torque reduction value that is larger than the first torque reduction value.

7. A vehicle lock-up control device for a vehicle having a torque converter with a lock-up clutch that is arranged between an engine and a transmission, the vehicle lock-up control device comprising:
    a lock-up control unit that upon issuance an engagement request of the lock-up clutch engages of the lock-up clutch through slip control that increases a lock-up capacity and gradually reduces a slip rotational speed, which is an input-output differential rotational speed of the lock-up clutch; and
    a cooperative control unit that carries out cooperative control of the lock-up clutch and the engine,
    the cooperative control unit being configured to execute an engine torque reduction control that reduces a torque of the engine to below a normal torque that is applied in response to a driver's request upon the slip rotational speed reaching or falling below a predetermined value during the slip control of the lock-up control unit.

* * * * *